March 11, 1969  W. G. MOONEY ET AL  3,432,187
TUBE COUPLING
Filed May 23, 1967
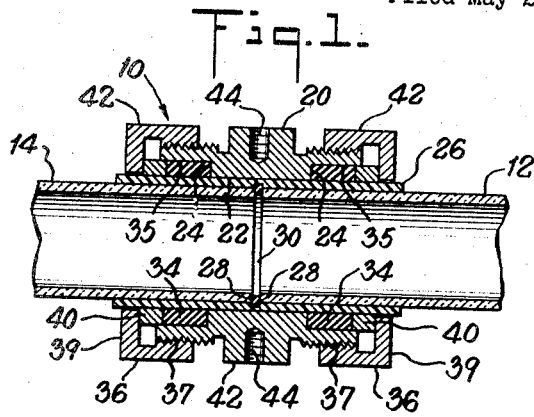
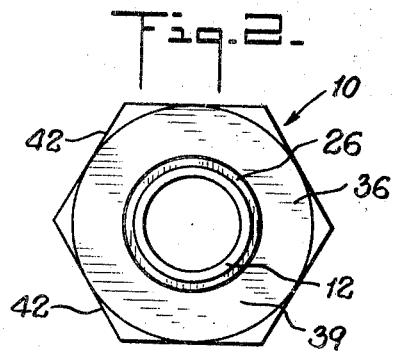
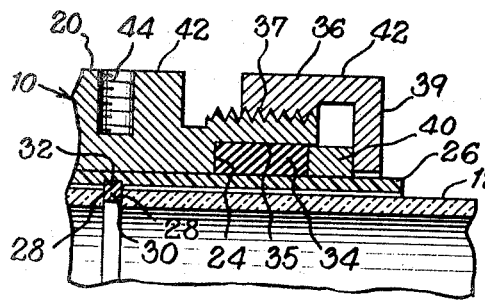
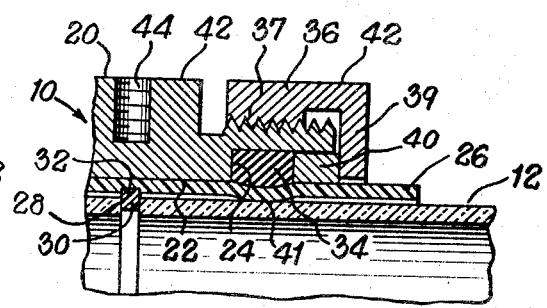
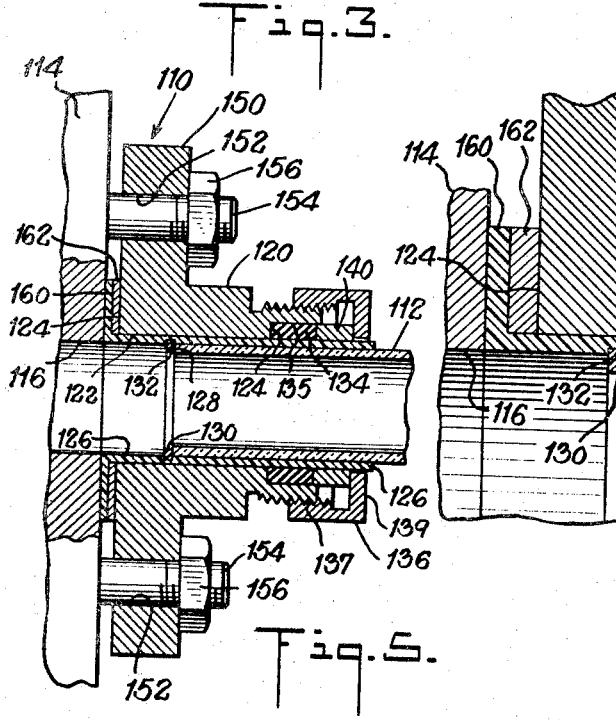
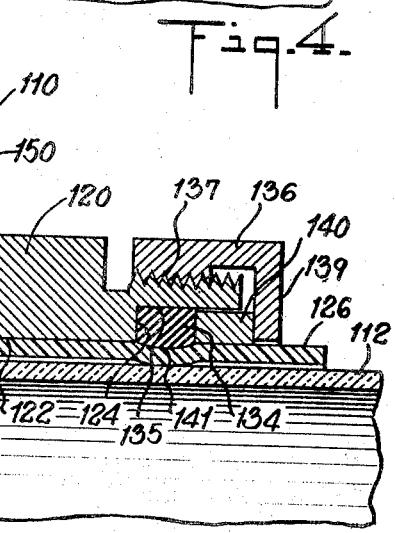
INVENTORS
WALTER G. MOONEY
LLOYD K. DUTTON
BY FRANCIS K. LYNCH
ATTORNEYS

United States Patent Office 3,432,187
Patented Mar. 11, 1969

3,432,187
TUBE COUPLING
Walter G. Mooney, Wayne, Lloyd K. Dutton, West Paterson, and Francis K. Lynch, Hewitt, N.J., assignors to Mooney Brothers Corp., Little Falls, N.J., a corporation of New Jersey
Filed May 23, 1967, Ser. No. 640,744
U.S. Cl. 285—55
Int. Cl. F16l *19/02, 19/06, 21/02*
8 Claims

ABSTRACT OF THE DISCLOSURE

A tube coupling for coupling tubes capable of carrying corrosive fluids, the tube coupling employing an outer body of relatively rigid, high strength material, an inner tubular member of a resiliently deformable, generally inert, corrosion resistant material such as a fluorocarbon resin received within the outer body and having a bore for receiving a tube therein, an annulus of elastomeric material placed around the inner member adjacent an end thereof, the annulus being affixed to the inner member and abutting a shoulder in the outer body so as to retain the inner member within the outer body against inadvertent removal therefrom, a nut threaded onto the outer body and means coupling the nut and the annulus such that upon threading the nut along the outer body the means will axially contract the annulus, radially contract the inner diameter of the annulus and thereby deform the inner tubular member radially inwardly to grip the tube therein.

---

The present invention relates generally to the tube couplings and pertains more specifically to tube couplings for coupling tubes capable of carrying corrosive fluids and assuring that the corrosive fluid is isolated from those structural components of the coupling which may be susceptible to corrosion. The term "corrosive fluids" is meant to encompass all fluids which should be isolated from those structural components of the coupling which are susceptible to some unfavorable reaction with the fluid conducted through the coupling, including those fluids which might themselves be contaminated or otherwise degraded by contact with the structural components, such as pure or ultrapure fluids which must be maintained at a high level of purity.

In many laboratory and manufacturing plant installations, various experiments and processes are carried out which require that a variety of corrosive fluids be conducted through networks of tubes. The tubes are generally fabricated of generally inert, corrosion resistant materials. Many of these materials, such as glass and ceramics, are frangible and any coupling which is employed to join the tubes at the various junctures in these networks should exert a firm, but gentle grip upon the joined tubes so as to maintain the connection rigid without placing undue stress upon the tubes themselves. At the same time the joints should be sealed against leakage of the corrosive fluid from the connection and against the exposure of corrodible component parts of the coupling to the corrosive fluid.

It is therefore an important object of the invention to provide a tube coupling which affords a rigid connection between tubes of corrosion resistant material and which confines corrosive fluids passing through the connection to contact with only generally inert, corrosion resistant component parts of the coupling.

Another object of the invention is to provide a tube coupling combining the relatively rigid, high strength characteristics of metallic components such as steel or aluminum with the resiliently deformable and corrosion resistant characteristics of certain generally inert synthetic resin materials such as fluorocarbon resins.

A further object of the invention is to provide a tube coupling having a simplified construction with a minimum number of component parts, each having a readily fabricated configuration.

The above objects, as well as further objects and advantages, are attained in the invention which can be described briefly as a tube coupling for coupling tubes capable of carrying corrosive fluids, the tube coupling comprising an outer body of relatively rigid, high strength material including an axial bore having an axial length between opposite ends, the outer body including a shoulder adjacent at least one of the opposite ends of the bore, an inner tubular member of a resiliently deformable, generally inert, corrosion resistant material such as a fluorocarbon resin, received within the bore of the outer body and having an inside diameter complementary to a tube to be received therein and a relatively larger outside diameter, the inner member having an axial length between opposite ends greater than the length of the bore, means at each of the opposite ends of the bore for retaining the inner tubular member within the bore of the outer body against inadvertent removal therefrom, the means including an annulus of elastomeric material affixed to the inner tubular member adjacent the one end of the bore of the outer body and abutting the shoulder therein, a threaded member threaded onto the outer body for axial movement relative thereto, and means coupling the threaded member and the annulus for axially contracting the annulus, radially contracting the inner diameter thereof and thereby deforming the inner member radially inwardly to grip the tube therein in response to axial movement of the threaded member.

The invention will be more fully understood and still further objects and advantages will become apparent in the following detailed description of preferred embodiments of the invention illustrated in the accompanying drawing, in which:

FIGURE 1 is a longitudinal cross sectional view of a junction between tubes and illustrating a tube coupling constructed in accordance with the invention;

FIGURE 2 is an end view of the junction of FIGURE 1;

FIGURE 3 is an enlarged fragmentary view of a portion of the junction of FIGURE 1;

FIGURE 4 is an enlarged fragmentary view similar to FIGURE 3, but with the component parts of the tube coupling in another position;

FIGURE 5 is a longitudinal cross sectional view of a tube connection employing an alternative tube coupling constructed in accordance with the invention; and FIGURE 6 is an enlarged fragmentary view of a portion of the tube coupling of FIGURE 5 with component parts thereof in another position.

Referring now to the drawing, and especially to FIGURES 1 and 2, a tube coupling constructed in accordance with the invention is shown generally at 10 and is seen receiving the confronting ends of tubes 12 and 14 to be joined in a connection. The tubes 12 and 14 are fabricated of a corrosion resistant material such as glass.

Coupling 10 has an outer body 20 including a bore 22 extending axially between shoulders 24 at opposite ends of the bore 22. An inner tubular member shown in the form of a sleeve 26 of resiliently deformable, corrosion resistant material is received within the bore 22 and extends axially beyond the shoulders 24 of the bore. The inside diameter of sleeve 26 is complementary to the outside diameter of the tubes 12 and 14 so that the tubes are readily inserted into the sleeve and advanced within the sleeve until the end of each tube abuts a centering stop shoulder 28 provided by an annular insert 30 seated within a groove 32 in the wall of sleeve 26 and having an inside diameter smaller than the inside diameter of the sleeve and the corresponding outside diameter of each tube.

In order to retain the sleeve 26 in place within the outer body 20 against inadvertent removal from the bore 22, an annulus 34 of elastomeric material is slipped over each end of the sleeve 26. Each annulus is received within a recess 35 in the outer body 20 and is brought into abutment with a shoulder 24. The relative normal diameters of each annulus 34 and the sleeve 26 are such that an annulus must be dilated in order to be assembled with the sleeve and such dilation establishes a frictional force with which the annulus grips the sleeve. Thus, the two annuli 34 retain the sleeve 26 within the bore 22 against inadvertent removal therefrom.

The tubes are clamped within the coupling by threaded members shown in the form of clamping nuts 36 which are threaded onto threaded portions 37 of the outer body 20 for axial movement relative to the outer body. Means are provided for coupling each nut 36 with a corresponding annulus 34 and are shown in the form of a flange portion 39 on each nut engaging a gland 40 which is received over the sleeve 26 for axial sliding movement relative thereto. The nuts 36 are ordinarily positioned to allow insertion of tubes 12 and 14 into sleeve 26 as seen in FIGURE 3. Upon the advancement of a nut 36 along the outer body, as seen in FIGURE 4, the flange 39 of the nut will engage a corresponding gland 40 and the gland will exert an axial pressure upon the annulus 34. Since the annulus is confined within the recess 35 and cannot expand either axial or radial outwardly, the axial pressure of the gland will contract the annulus axially and will contract the inside diameter thereof radially inwardly to deform the sleeve 26 against the tube 12 at 41. The deformation of sleeve 26 establishes a firm but gentle clamping force which will secure tube 12 within the sleeve 26 and within the coupling 10. At the same time, the deformation of sleeve 26 establishes a seal between the sleeve and the tube so that any corrosive fluid being conducted through the tubes is confined within the tubes and within the sleeve 26.

It is important that the joint thus established between the tubes 12 and 14 be relatively rigid as well as well sealed. Thus, the outer body 20 is constructed of a relatively rigid, high strength material, preferably a metal such as steel or aluminum. The outer body 20 and the sleeve 26 are long enough to receive a sufficient length of the tubes 12 and 14 to assure a relatively rigid connection between the tubes. The centering stop shoulders 28 provided by annular insert 30 assures that both tubes 12 and 14 will be inserted for such a sufficient length.

The outer body 20, as well as nuts 36, is provided with a wrenching configuration at 42 so as to enable the outer body 20, as well as the nuts 36, to be easily gripped for controlled advance of the nuts and a controlled build-up of the forces acting to grip the tubes. Such control is advantageous in view of the frangible nature of most of the corrosion resistant materials employed for the tubes 12 and 14. Additionally, the nature of the material of the outer body 20 permits ready modification of the outer body 20 to conform to the requirements of a particular installation. For example, one or more tapped holes, such as tapped holes 44, may be provided in the outer body for receiving anchor rods (not shown) which will hang or otherwise mount the coupling within the system in which the coupling 10 is installed.

Each annulus 34 is preferably fabricated of an elastomeric material such as rubber or Neoprene and is confined to recess 35, which communicates with sleeve 26, in order to attain controlled contraction of the annuli and the sleeve without interfering with the advancement of the nuts 36.

The sleeve 26 is preferably fabricated of a synthetic resin material such as a fluorocarbon resin. A fluorocarbon resin such as polytetrafluoroethylene has been found to provide adequate corrosion resistant characteristics as well as being resiliently deformable to the extent required. Because the sleeve 26 is a simple cylindrical shape, the sleeve is easily fabricated and readily replaced. Annular insert 30 may also be fabricated of a fluorocarbon resin.

Turning now to FIGURES 5 and 6, another embodiment of the invention is shown in the form of a flanged end coupling 110. Coupling 110 is seen joining a tube 112 with an apertured plate 114 having a passage 116 for conducting fluid from the tube 112 through the plate 114. Plate 114 may be the wall of a vessel or a valve or another piece of equipment constructed of corrosion resistant material.

Coupling 110 has an outer body 120 including a bore 122 extending axially between shoulders 124 at opposite ends of bore 122. A sleeve 126 of resiliently deformable, corrosion resistant material, such as a fluorocarbon resin, is received within bore 122 and extends axially beyond the shoulders 124 of the bore. As in the embodiment of FIGURES 1 through 4, the inside diameter of sleeve 126 is complementary to the outside diameter of the tube 112 so that the tube is readily inserted into the sleeve and advanced within the sleeve until the end of the tube abuts a stop shoulder 128 provided by an annular insert 130 seated within a groove 132 in the wall of sleeve 126 and having an inside diameter smaller than the inside diameter of the sleeve and the corresponding outside diameter of the tube.

As in the embodiment of FIGURES 1 through 4, an annulus 134 of elastomeric material is slipped over the end of the sleeve 126, is received within a recess 135 in the outer body 120 and is brought into abutment with a shoulder 124. The relative normal diameters of the annulus 134 and the sleeve 126 are such that the annulus must be dilated in order to be assembled with the sleeve and such dilation establishes a frictional force with which the annulus grips the sleeve.

The tube 112 is clamped within the coupling 110 by a clamping nut 136 which is threaded onto threaded portion 137 of the outer body 120 for axial movement relative to the outer body. Nut 136 is provided with a flange 139 received over the sleeve 126 which engages a gland 140 for axial sliding movement relative thereto. Nut 136 is ordinarily positioned to allow insertion of tube 112 into sleeve 126 as seen in FIGURE 5. Upon the advancement of the nut along the outer body, as seen in FIGURE 6, the flange 139 will engage the gland 140 and the gland will exert an axial pressure upon the annulus 134. Since the annulus is confined within the recess 135 and cannot expand either axially or radially outwardly, the axial pressure of the gland will contract the annulus axially and will contract the inside diameter of the annulus radially inwardly to deform the sleeve 126 against the tube 112 at 141. The deformation of sleeve 126 establishes a firm but gentle clamping force which will secure tube 112 within the sleeve 126 and within the coupling 110. At the same time, the deformation of sleeve 126 establishes a seal between the sleeve and the tube so that any corrosive fluid being conducted through the tube and through the passage 116 and plate 114 is confined within the tube, the plate and the sleeve 126.

In order to secure the coupling 110 to the apertured plate 114, the outer body 120 is provided with a flange portion 150 having apertures 152 through which are passed threaded studs 154 which receive complementary threaded fasteners 156 for securing the flange portion 150 to the apertured plate 114. Sleeve 126 is also provided with a flange portion 160 and a backing gasket 162 is placed between the flange portion 160 and the flange portion 150 so that upon securing the flange portion 150 to the apertured plate 114, an evenly distributed clamping pressure will urge the flange portion 160 against the apertured plate 114 and radially seal the connection between passage 116 and tube 112. In addition, the flange portion 160 and the annulus 134 will serve to retain the sleeve 126 within the bore 122 of outer body portion 120 against inadvertent removal therefrom, thus providing a simplified construction including easily manufactured component parts which are readily assembled into an easily used coupling.

It is to be understood that the above detailed description of preferred embodiments of the invention are provided by way of example only. Various details of design and construction may be modified without departing from the true spirit and scope of the invention.

The embodiments of the invention in which an exclusive property or privilege is claimed are defined as follows:

1. A tube coupling for coupling tubes capable of carrying corrosive fluids, said tube coupling comprising:
   an outer body of relatively rigid, high strength material including an axial bore having an axial length between opposite ends, said outer body including a shoulder adjacent at least one of said opposite ends of the bore;
   an inner tubular member of resiliently deformable, generally inert, corrosion resistant material such as a fluorocarbon resin received within the bore of the outer body and having an inside diameter complementary to a tube to be received therein and a relatively larger outside diameter, said inner member having an axial length between opposite ends greater than the length of said bore;
   means adjacent each of said opposite ends of the bore for retaining the inner tubular member within the bore of the outer body against inadvertent removal therefrom, said means including an annulus of elastomeric material affixed to the inner tubular member adjacent said one end of the bore of the outer body and abutting the shoulder therein;
   a threaded member threaded onto the outer body for axial movement relative thereto; and
   means coupling the threaded member and the annulus for axially contracting the annulus, radially contracting the inner diameter thereof and thereby deforming the inner tubular member radially inwardly to grip the tube therein in response to axial movement of the threaded member.

2. The tube coupling of claim 1 including an annular insert intermediate the ends of the inner tubular member and having an inner diameter less than the inside diameter of the tubular member for establishing a stop shoulder against which may be placed the end of the tube received within the inner member.

3. The tube coupling of claim 1 wherein the relative dimensions of the inner diameter of the annulus and the outside diameter of the inner member require dilation of the annulus when the annulus is in position upon the inner tubular member and the annulus is affixed to the inner tubular member by virtue of a frictional gripping force established by such dilation.

4. The tube coupling of claim 1 wherein:
   the outer body includes a shoulder adjacent each opposite end thereof;
   the inner member projects axially outwardly beyond each shoulder of the outer body; and
   said retaining means include an annulus of elastomeric material affixed adjacent each end of the inner member with each annulus abutting a corresponding shoulder of the outer body to retain the inner member within the outer body against inadvertent removal therefrom.

5. The tube coupling of claim 4 wherein the outer body includes a recess adjacent each opposite end thereof and communicating with the inner member, the annulus of elastomeric material being confined within said recess.

6. The tube coupling of claim 1 wherein:
   the outer body is provided with a flange portion at the opposite end thereof; and
   the inner tubular member is provided with an integral flange portion of the same resiliently deformable, corrosion resistant material cooperating with the outer body adjacent said opposite end of the outer body and extending radially outwardly to establish a radial seal of such material at the corresponding end of the tube coupling.

7. The tube coupling of claim 6 wherein the outer body includes a recess adjacent said one end of the bore and communicating with the inner member, said annulus of elastomeric material being confined within said recess.

8. The tube coupling of claim 1 wherein:
   the threaded member is a nut; and
   the means coupling the threaded member and the nut include an annulus gland slidably received over the inner member between the annulus and the corresponding end of the inner member, and a flange integral with said nut and engaging the gland to urge the gland against the annulus in response to movement of the nut along the outer body.

References Cited

UNITED STATES PATENTS

| 581,675 | 4/1897 | Edson | 285—423 X |
| 2,513,115 | 6/1950 | Sprigg | 285—383 X |
| 3,178,206 | 4/1965 | Martin et al. | |
| 3,243,207 | 3/1966 | Carpenter et al. | |
| 3,335,758 | 8/1967 | Bertolet | 285—55 X |
| 3,359,018 | 12/1967 | Simons | 285—423 X |

FOREIGN PATENTS

| 1,207,150 | 8/1959 | France. |
| 960,436 | 6/1964 | Great Britain. |

THOMAS F. CALLAGHAN, Primary Examiner.

U.S. Cl. X.R.

285—423, 158, 369, 248